United States Patent Office 3,208,993
Patented Sept. 28, 1965

3,208,993
CYCLIC ACETAL POLYALLYLIDENE
OLIGOSACCHARIDES
Rudolph F. Fischer, Oakland, and Curtis W. Smith, Berkeley, Calif., assignors to Shell Oil Company, New York, N.Y., a corporation of Delaware
No Drawing. Filed May 15, 1961, Ser. No. 109,872
8 Claims. (Cl. 260—209)

This application is a continuation-in-part of our copending application Serial No. 802,287, filed March 27, 1959, now U.S. 2,987,524, which is a divisional application of the patent application Serial No. 527,156, filed August 8, 1955, now U.S. 2,888,492.

This invention relates to noval cyclic acetals and to their preparation. More particularly, the invention relates to novel polyolefinic polycyclic acetals, and to their preparation from polyhydric alcohols and olefinic aldehydes.

It is an object of the present invention to provide a new class of polycylic acetals. Another object of the invention is the provision of a new class of polycyclic polyolefinic acetals. The preparation of such acetals by the reaction of polyhydroxy alcohols with olefinically unsaturated aldehyde is another object of the invention. Still another object is the provision of a novel class of polyolefinic acetals which may readily be epoxidized to afford useful resin-forming polyepoxides. Other objects will be apparent from the following description of the invention.

These objects are accomplished in the invention by the cyclic acetals of alpha,beta-olefinic alkenals and polyhydric alkanols having a plurality of hydroxyl groups wherein each hydroxyl group is attached to a carbon atom which is separated from the nearest carbon atom attached to a second hydroxyl group, by no more than one carbon atom. These compounds may have the structure

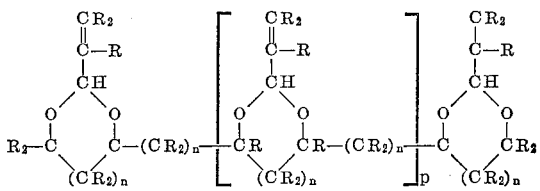

where each R is selected from the group consisting of hydrogen and alkyl, each $n$ is an integer from 0 to 1, and $p$ is an integer from 0 to 2. Preferred members of this class of polycylic acetals are those wherein $n$ is equal to 0.

Preferred acetals are those derived from polyols having an even number of hydroxyl groups. Exemplary of such compounds are those cyclic acetals having a plurality of five-membered rings such as triallylidene sorbitol; tetrallylidene mannooctitol; diallylidene erythritol; di-(methallylidene)erythritol; dicrotylidene hexaerythritol; and the like.

Typical of such compounds wherein each ring has six members are the cyclic vinyl acetals of 1,3,5,7-tetrahydroxyheptane; of 1,3,6,8-tetrahydroxyoctane; of 1,3,5,7,9,11-hexahydroxyundecane; and the like.

The nature of these polycyclic poly acetals may best be understood by a detailed consideration of the manner in which they are prepared. Preparation of the acetals is accomplished by reacting an alpha,beta-olefinic alkenal, preferably having no more than eight carbon atoms, with a polyhydric alkanol having a plurality of hydroxy groups, in liquid phase in the presence of an acidic condensation catalyst.

The polyhydric alkanols are those having more than one and preferably an even number of hydroxyl groups, most preferably at least four, wherein each hydroxyl group is attached to a carbon atom which is separated by no more than one carbon atom from a carbon atom to which a second hydroxyl group is attached. Thus, three types of configurations are defined: the first being where the hydroxyl groups are on adjacent carbon atoms

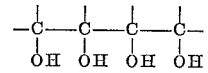

the second being where a carbon atom is interposed between the hydroxylic carbon atoms

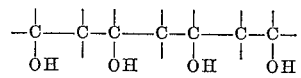

and the third configuration is a combination of the first and second, i.e.,

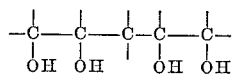

or

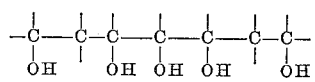

and the like.

Typical of such alcohols are the tetrahydroxy alcohols, such as butanetetrol-1,2,3,4; pentanetetrol-1,2,3,4; hexanetetrol-1,2,5,6. Hexahydroxy alcohols include sorbitol and its isomers, such as mannitol, inositol, d-iditol, and the like. Representative of octahydroxy alkanols are alpha-glucooctito and d-mannooctitol. These alcohols have the structure

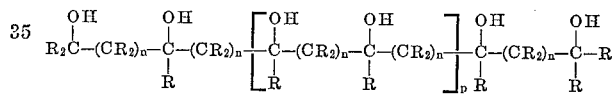

wherein each R is hydrogen or alkyl, preferably of up to four carbon atoms; each $n$ is an integer from 0 to 1; and $p$ is an integer from 0 to 2. Preferably, the chain connecting the hydroxyl groups has no more than eight carbon atoms. The particularly preferred alcohols are those wherein $n$ is 0 and wherein each carbon atom of the chain is attached to a hydroxyl group.

The unsaturated aldehydes with which these alcohols are reacted are the alpha,beta-ethylenically unsaturated alkenals having the general structure

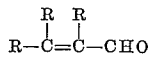

wherein each R is selected from the group consisting of the hydrogen atom and lower alkyl radicals, preferably having up to 4 carbon atoms. Such aldehydes are exemplified by alpha-isobutyl acrolein; alpha-n-propyl acrolein; alpha-n-butyl acrolein; crotonaldehyde; beta-methyl crotonaldehyde; alpha,beta-dimethyl crotonaldehyde; alpha,beta-dimethyl acrolein; 2-pentenal; 2 hexenal and the like.

Preferred alkenals are the alpha-methylidene aldehydes of the formula

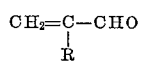

wherein R has the above significance. These compounds are acrolein and alpha-substituted acroleins, e.g., methacrolein, ethacrolein. Of these, the preferred embodiment is acrolein, which R is the most reactive and affords cyclic acetals of superior properties.

The formation of the acetal is accomplished by reacting together the polyhydroxy alkanol and the alpha, beta-unsaturated alkenal in liquid phase in the presence of a catalytic amount of an acidic catalyst. Preferred acids are those sulfo acids represented by sulfuric acid; p-toluenesulfonic acid; ethanesulfonic acid and the like. From about 0.02 to about 0.06 mole of acid per mole of aldehyde has been found to be effective for the condensation. The reaction may be carried out conveniently by heating a mixture of the chosen alpha,beta-ethylenic aldehyde and polyol, preferably containing about 5 to 50% excess of aldehyde over the stoichiometric requirement for the reaction, dissolved or suspended in a suitable inert liquid. Typical liquids include aromatics, such as benzene, toluene, xylene and the like; and paraffins or haloparaffins, such as hexane, octane, dichloroethylene, etc.

The reaction is preferably carried out by refluxing at about 50° C. to about 90° C. as, for example, under a phase-separating head, until the theoretical amount of water has been removed. When carried out in this manner, the reaction is completed in about 1 to 3 hours, and high yields of unsaturated cyclic acetals are obtained.

It is important in this method of producing cyclic unsaturated acetals to use the acid catalyst in the indicated proportions. When less than 0.02 mole of acid per mole of aldehyde is used, the reaction time is extended and plant capacity is correspondingly reduced with consequent increased operating cost. If more than 0.06 mole of acid per mole of aldehyde is employed, the yield of unsaturated acetal may be reduced as a result of addition of hydroxyl to the ethylenic double bond. The compounds of the invention form two principal types of products, dioxanes and dioxolanes. Thus, when the polyol is one wherein each of a pair of carbinolic carbon atoms is separated from the other by an intervening alkylene group, the resulting cyclic acetals are 1,3-dioxanes. For example, the polycyclic polyolefinic acetal derived from acrolein and 1,3,4,6-hexanetetrol has the structure

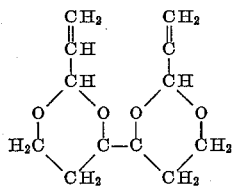

4-[2-vinyl-1,3-dioxanyl-4]-2-vinyl-1,3-dioxane

In contrast, the cyclic acetals derived from polyols wherein each of a pair of the carbinolic carbon atoms is directly connected to the other, the cyclic acetals are 1,3-dioxolanes. For example, the dioxolane obtained by reaction of methacrolein and 1,2,3,4-butanetetrol is

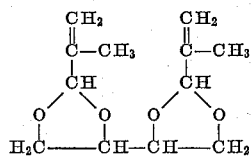

4-[2-alpha-methylvinyl)-1,3-dioxolanyl-4]-2-alpha-methylvinyl)-1,3-dioxolane

One particularly useful class of the cyclic acetals of the invention is that represented by the reaction product of a dihydroxyalkonol wherein the hydroxyl groups are separated by three carbon atoms. These compounds are thus 1,3-dioxanes of the formula

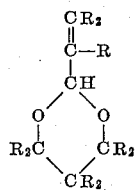

wherein R has the above significance. Exemplary of these compounds is 2-vinyl-1,3-dioxane, the reaction product of acrolein and trimethylene glycol. Other compounds of this type include 2-vinyl-5-ethyl-5-butyl-1,3-dioxane from acrolein and 2-ethyl-2-butyl-1,3-propanediol; 2-vinyl-5,5-diethyl-1,3-dioxane from acrolein and 2,2-diethyl-1,3-propanediol; 2 - vinyl-4-propyl-5-ethyl-1,3-dioxane from acrolein and 2-ethyl-1,3-hexanediol; and 2-vinyl-4,4,6-trimethyl-1,3-dioxane from acrolein and hexylene glycol. Similar compounds may, of course, be prepared from methacrolein and the other alkenals noted with the alpha,gamma-dihydroxy polyols described. The preferred polyols are those having two carbinol groups separated by one carbon atom and containing up to 10 carbon atoms.

The novel cyclic acetals of the invention are useful for a plurality of applications. Not only do they serve as intermediates in the preparation of polyols, as shown in U.S. Patent 2,888,492, issued May 26, 1959, but because of the olefinic substituent they will undergo polymerization and addition reactions. Thus, the cyclic acetals having a plurality of vinyl groups form useful resinous materials by homopolymerization or by copolymerization with other polymerizable ethylenic compounds, such as vinyl chloride, butadiene, etc. The monoethylenic compounds can be reacted with conjugated diolefinic compounds such as butadiene to form Diels-Alder adducts. Some or all of the ethylenic groups may be epoxidized to afford useful mono- or polyepoxy compounds which may be cured to yield resinous solids for coating or casting applications.

One type of polyhydric alcohol polyacetal is that derived from polyvinyl alcohol. The term polyvinyl alcohol refers generally to a polymeric material having a wholly carbon backbone to which are attached a plurality of polymerized, i.e., combined vinyl alcohol

—CH$_2$CHOH units intralinear to the polymer chain. The polyvinyl alcohols are available in a wide range of degrees of hydrolysis and molecular weights. Preferred for use as reactants in the instant invention are those having degrees of hydrolysis of from about 87–100% and viscosities of 4–60 centipoises in 4% aqueous solution at 20° C. (determined by Hoeppler falling ball method).

When reacted with an unsaturated aldehyde of the type described above, the product cyclic acetals have the recurring structure

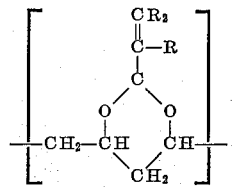

where R has the above significance.

These polycyclic acetals of polyvinyl alcohols are solids which can be formed into tough, flexible moldings by techniques used for the forming of polyvinyl alcohol moldings. Thus, by molding the polyallylidene polyacetal of polyvinyl alcohol under heat and pressure, a tough transparent flexible molded product is readily obtained.

Another related type of polyhydric alcohol acetal derived from the olefinically unsaturated aldehydes described are those derived from the oligosaccharides. The oligosaccharides are those carbohydrates containing up to ten monosaccharide residues per molecule. Exemplary of these compounds are the disaccharides, trisaccharides, tetrasaccharides, pentasaccharides, and the like. These include trehalose, gentibiose, cellobiose, turanose, maltose, lactose, melibiose, sucrose, raffinose and melezitose, gentianose, maltotriose, manninotriose, and stachyose.

These polysaccharide compounds are generally known as sugars, and the polycyclic polyolefinic acetals of these sugars are chracterized by high molecular weight, relatively low solubility in common solvents, and a tendency to form gels by cross-linking.

Products obtained by the reaction of acrolein with such sugars can conveniently be termed polyallylidene oligosaccharides. For example, the reaction product of sucrose and acrolein is polyallylidene sucrose; of maltose and acrolein is polyallylidene maltose, etc. These polyacetals are characterized by a plurality of $$\begin{array}{c} CR_2 \\ \parallel \\ C-R \\ | \\ C \\ / \phantom{C} \backslash \\ O \phantom{CC} O \\ | \phantom{CCC} | \\ -C\phantom{CC}C- \\ | \phantom{CCC} | \\ H \phantom{CC} H \end{array}$$

rings disposed on an oligosaccharide backbone.

To illustrate further the novel and improved compounds of the invention, the following examples are presented. It should be understood, however, that the examples are merely illustrative and are not to be regarded as limitations to the appended claims since the basic teachings therein may be varied at will as will be understood by one skilled in the art. In the examples, the proportions are expressed in parts by weight unless otherwise noted.

EXAMPLES I–III

The glycols employed were mixed thoroughly with a slight excess of acrolein, one to three volumes of an azeotroping agent such as benzene and a small quantity of p-toluenesulfonic acid, and refluxed vigorously under a phase-separating head until evolution of water had ceased.

The excess of acrolein and some benzene were then removed by atmospheric distillation through the head, and the residue was cooled. Into the cooled residue was stirred calcium oxide in excess. The mixture was then filtered and the dried liquid was stripped and distilled at reduced pressure.

The experiments performed in this manner are summarized in the following table.

*Table I*

SYNTHESIS OF ACROLEIN ACETALS

| Alcohol | Product | Conversion of alcohol to product, percent | Yield on alcohol, percent | Excess acrolein present, percent | Solvent | Mole percent of catalyst present | Time, hrs. |
|---|---|---|---|---|---|---|---|
| Hexylene glycol | 2-vinyl-4,6,6-trimethyl-1,3-dioxane. | 98.5 | 98.5 | 10 | Benzene | 0.026 | 2.5 |
| Trimethylene glycol | 2-vinyl-1,3-dioxane | 78 | 78 | none | 67% benzene, 33% ether. | 0.043 | 3 |
| Sorbitol | Triallylidene sorbitol | 33 | 33 | 10 | Benzene | 0.059 | 8 |

The properties of the resulting products are set forth in Table II.

*Table II*

| Product | B. P. | $n_D^{20}$ | Analyses |
|---|---|---|---|
| 2-vinyl-4,6,6-trimethyl-1,3-dioxane. | 62–64°/18 mm | 1.4381 | Calcd: C, 69.3; H, 10.2; Br₂ No., 102 g./100 g. Found: C, 69.1; H, 10.3; Br₂ No., 100 g./100 g. |
| 2-vinyl-1,3-dioxane | 65–66°/44 mm | 1.4438 | Calcd: C, 63.1; H, 8.8. Found: C, 62.9; H, 8.8. |
| 2-vinyl-4,5-di(3-vinyl-2,4-dioxolanyl)-1,3-dioxolane. | 149–151°/0.9 mm | 1.4865 | Calcd: C, 60.8; H, 6.8 Br₂ No., 162 g./100 g. Found: C, 60.9; H, 6.9; Br₂ No., 158 g./100 g. |

EXAMPLE IV

To a reaction vessel as in the previous experiments was charged 29 g. of 88% hydrolyzed polyvinyl alcohol (Elvanol Grade 72–05) 0.2 g. of oxalic acid and 250 cc. of dried acrolein. The resulting mixture was stirred under reflux for a total of 17 hours and then cooled.

The unreacted acrolein was then distilled off, and the residue filtered and extracted with petroleum ether several times.

The product was 31 g. of a solid. Analysis of the product gave the following data:

Percent w.: C, 58.2; H, 8.3

This corresponds to a polymer having the repeating structure $$\left[\begin{array}{c} CH=CH_2 \\ | \\ C \\ / \phantom{C} \backslash \\ O \phantom{CC} O \\ | \phantom{CCC} | \\ -C \phantom{CC} CH- \\ \phantom{C}\backslash \phantom{CC} / \\ \phantom{CCC}CH_2 \end{array}\right]$$

The vinyl acetals of two types of polyvinyl alcohol were prepared in this manner. The polyvinyl alcohols and their properties are tabulated below:

| Amount of PVA | Commercial grade | Viscosity | Degree of hydrolysis, percent | Weight of acetal, g. | Percent w. C | Percent w. H | Acidity, eq./100 g. |
|---|---|---|---|---|---|---|---|
| 1. 36 g | du Pont 51–05 | Low | 88 | 40 | 58.2 | 8.3 | 0.007 |
| 2. 88 g | du Pont 72–05 | Low | 88 | 92 | 52.7 | 8.7 | 0.006 |
| 3. 75 g | du Pont 51–05 | Low | 88 | 102 | 58.1 | 8.0 | 0.004 |

The product from the third run was evaporated to dryness, swelled in tetrahydrofurane, and then redried. It was then molded in a press at 160° C. and 800 p.s.i. pressure to yield a tough, dense, flexible transparent solid, capable of being cold-drawn.

EXAMPLE V

Polyallidene sucrose was prepared in the following manner.

To a vessel fitted with a reflux condenser was charged 100 g. of powdered sucrose, 250 cc. of acrolein and 1 g. p-toluenesulfonic acid in 1 ml. of water. The mixture was refluxed with stirring for a total of 6 hours. The product on cooling was a gelatinous material which was easily removed from the vessel with a spatula.

The gel was washed repeatedly with distilled water to remove unreacted sucrose and acid, and then washed with acetone. Upon analysis, the following data were obtained:

Found: C, 53.8; H, 7.0

The polyacetal was relatively insoluble in water and in chloroform, swelled in acetone and dissolved slowly in ethylene glycol monomethyl ether.

We claim as our invention:

1. The compound of the structure

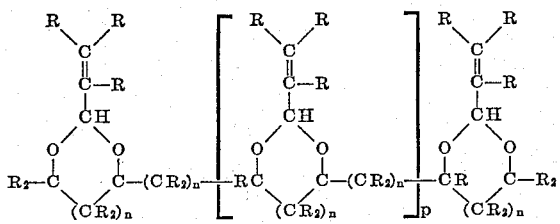

wherein each R is a member of the group consisting of hydrogen and alkyl of up to four carbons, each $n$ is an integer from 0 to 1 and $p$ is an integer from 0 to 2.

2. The compound of the structure

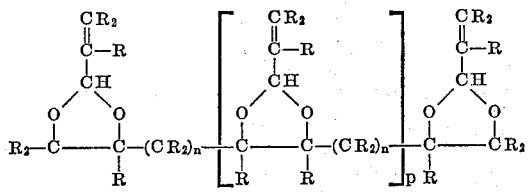

wherein each R is a member of the group consisting of hydrogen and alkyl of up to four carbons, each $n$ is an integer from 0 to 1 and $p$ is an integer from 0 to 2.

3. Triallylidene sorbitol.

4. The polycyclic acetal of sucrose and an alpha,beta-olefinic alkenal of the formula

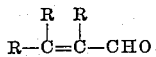

wherein each R is a member of the group consisting of hydrogen and lower alkyl.

5. Polyallylidene sucrose.

6. The polycyclic acetal of an alpha,beta-olefinic alkenal of the general formula

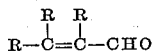

wherein each R is a member of the group consisting of hydrogen and lower alkyl and a polyhydric alkanol having at least four hydroxyl groups, each hydroxyl group being attached to a carbon atom separated by no more than one carbon atom from the nearest carbon atom to which is attached a second hydroxyl group.

7. The polycyclic acetal defined in claim 6 wherein each acetal ring is the 2-vinyl-1,3-dioxolanyl ring.

8. The polycyclic acetal defined in claim 6 wherein each acetal ring is the 2-vinyl-1,3-dioxolanyl ring.

References Cited by the Examiner

UNITED STATES PATENTS

| | | | |
|---|---|---|---|
| 2,432,601 | 12/47 | Wiley. | |
| 2,527,495 | 10/50 | Fitzgugh | 260—73 |
| 2,593,276 | 4/52 | De Groote | 260—209 |
| 3,010,918 | 11/61 | Ikeda | 260—73 |

LEWIS GOTTS, *Primary Examiner.*